United States Patent [19]

Senuma

[11] 4,417,797
[45] Nov. 29, 1983

[54] VARIABLE FORCE ELECTROMAGNETIC SHUTTER

[75] Inventor: Michio Senuma, Tokyo, Japan

[73] Assignee: Canon Kabushiki Kaisha, Tokyo, Japan

[21] Appl. No.: 333,563

[22] Filed: Dec. 22, 1981

[30] Foreign Application Priority Data

Dec. 27, 1980 [JP] Japan ................................ 55-186509

[51] Int. Cl.³ .............................................. G03B 9/08
[52] U.S. Cl. ..................................... 354/234; 354/246
[58] Field of Search ................ 354/234, 235, 245, 246

[56] References Cited

U.S. PATENT DOCUMENTS 4,268,153  5/1981  Sugiura et al. ...................... 354/234
4,338,013  7/1982  Shimada et al. .................... 354/234

Primary Examiner—A. A. Mathews
Attorney, Agent, or Firm—Toren, McGeady and Stanger

[57] ABSTRACT

In the disclosed focal plane shutter, desired travelling characteristics of shutter curtains are obtained by adjusting the distribution of magnetic flux density between the permanent magnet and the coil which constitute an electromagnetic drive source. Preferably, the flux density is arranged to be a maximum closer to the start position than the end position.

6 Claims, 13 Drawing Figures

VARIABLE FORCE ELECTROMAGNETIC SHUTTER

BACKGROUND OF THE INVENTION

1. Field of the Invention

This invention relates to a shutter and more particularly to a focal plane shutter of the type arranged to be electromagnetically operated.

2. Description of the Prior Art

Shutter devices of varied kinds employing an electromagnetic force as a drive source have been proposed as a result of recent developments in permanent magnets that give higher magnetic fluxes. However, for driving a focal plane shutter with such an electromagnetic device, it has been extremely difficult to arbitrarily set the travelling characteristics of shutter curtains.

Generally, a focal plane shutter is arranged to have its leading shutter curtain (or blades) and the trailing shutter curtain (or blades) driven by their own drive sources; and an exposure is effected for a period of time during which a slit formed between the leading and trailing shutter curtains passes across the front of a photo-sensitive film. Therefore, a difference between the travelling characteristic of the leading shutter curtain and that of the trailing shutter curtain would cause various parts of a picture to have different exposure times and would thus result in unevenness of the exposed portion of the photo-sensitive film.

The travelling characteristic of a shutter curtain is determined by the output characteristic of the drive source, the inertia and friction of the moving members of the shutter, etc. The relation of the travelling distance of the shutter curtain to the travelling time does not change linearly. Particularly, as is well known, the travelling speed is slow at the start. The speed of travel is then gradually accelerated as time elapses.

Before commencement of an exposure, the leading and trailing shutter curtains have their ends overlap each other to prevent light from leaking. They are thus arranged to have different start positions. The leading curtain has its start at a point away from the edge of an exposure window while the trailing curtain has its start at a point closer to the exposure window. Therefore, if the travelling characteristic of the leading shutter curtain is exactly the same as that of the trailing shutter curtain, the exposure time at an area of the picture around the exposure starting point would be short while the exposure time at another area of the picture around an exposure ending point would be long. This results in an uneven exposure.

To solve this problem, a conventional spring operated type focal plane shutter varies the output characteristic of a spring for driving the leading shutter curtain from that of a spring for driving the trailing shutter curtain. The trailing curtain has been thus arranged to accelerate more quickly than the leading curtain. In other words, the trailing shutter curtain has been arranged to have a faster rise time than the leading shutter curtain. Hence, the wire diameter, coil diameter and number of turns of one shutter curtain driving spring are arranged to differ from those of the other shutter curtain driving spring. In addition to that, at the time of assembly and adjustment work, the strength of each spring has been adjusted to prevent an unevenness of exposure from showing in a picture.

In cases where an electromagnetic device is employed as drive source and particularly where a focal plane shutter is provided with an electromagnetic drive source of the meter type having a moving coil or a moving magnet, it has been extremely difficult to make the adjustment mentioned above.

SUMMARY OF THE INVENTION

It is an object of the present invention to provide an electromagnetically driven type focal plane shutter which obviates the fear of uneven exposure.

It is another object of the invention to provide a shutter having a rotary electromagnetic drive source which permits preadjustment of the magnetic flux density distribution of a magnetic field formed according to the rotation phase of a rotation shaft between a coil and a permanent magnet to a predetermined relation in such a manner as to obtain a desired travelling characteristic of each of the shutter curtains (or blades).

In an embodiment of the invention, the position of magnetization distribution and the rotation starting position of the rotation shaft are arranged to be adjustable in relation to each other. In another embodiment, the width of a magnetic gap between the permanent magnet and a yoke are arranged to vary at every position of the travelling stroke of the shutter curtain or blades.

These objects, features and advantages of the invention will become apparent from the following detailed description of preferred embodiments thereof taken in connection with the accompanying drawings.

DESCRIPTION OF PREFERRED EMBODIMENTS

Figure 1A:
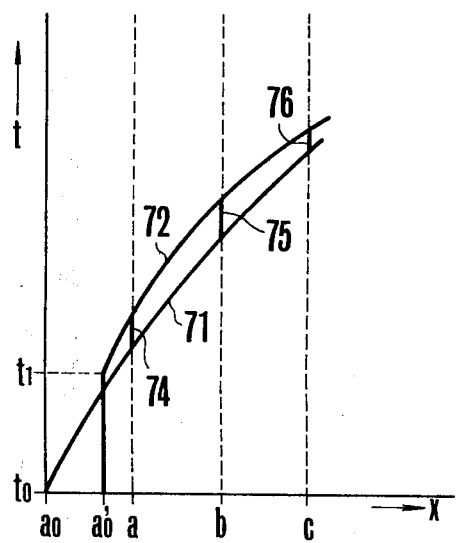
FIGS. 1(a) and 1(b) are diagrams respectively showing the travelling characteristics of the leading and trailing curtains of a slit exposure type shutter, FIG. 1(a) showing an over exposure in the middle of the travel and FIG. 1(b) showing an under exposure in the middle of the travel.
Figure 1B:
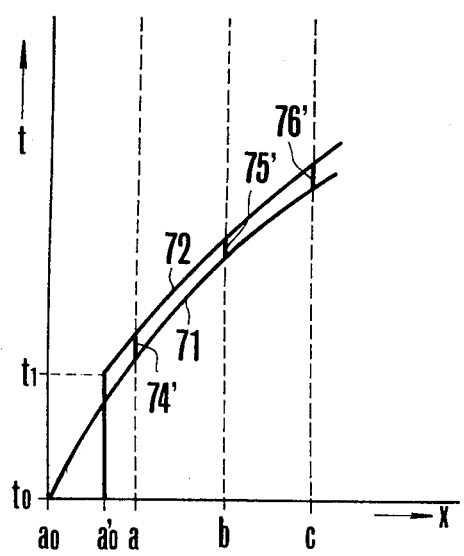

In FIGS. 1(a) and 1(b), which illustrate the travelling characteristics of the leading and trailing curtains (or groups of shutter blades) of the conventional focal plane shutter, the abscissas of the drawings indicate the shutter curtain travelling distance while the ordinates indicate time. A reference symbol ao indicates the travel starting position of the leading curtain; a'o indicates the travel starting position of the trailing curtain; a symbol to indicates the travel start time of the leading curtain; a symbol tl indicates the travel start time of the trailing curtain; a reference numeral 71 indicates a curve representing the travel of the leading shutter curtain; a numeral 72 indicates a curve representing the travel of the trailing shutter curtain; further, a symbol a indicates the exposure start position of an exposure window; a symbol b indicates the middle position thereof; a symbol c indicates the exposure end position thereof; numerals 74 and 74' indicate exposure time at the position a; numerals 75 and 75' indicate exposure time at the position b; and 76 and 76' indicate exposure time at the position c.

In the case of FIG. 1(a), the leading and trailing shutter curtains exhibit about the same travelling characteristics in the vicinity of their travel starting position. In the vicinity of the middle part of the picture, however, the exposure time is longer than the exposure time at both ends. Whereas, in FIG. 1(b), the exposure time in the middle part is shorter than the exposure time at both end parts and thus results in an underexposure.

Figure 2:
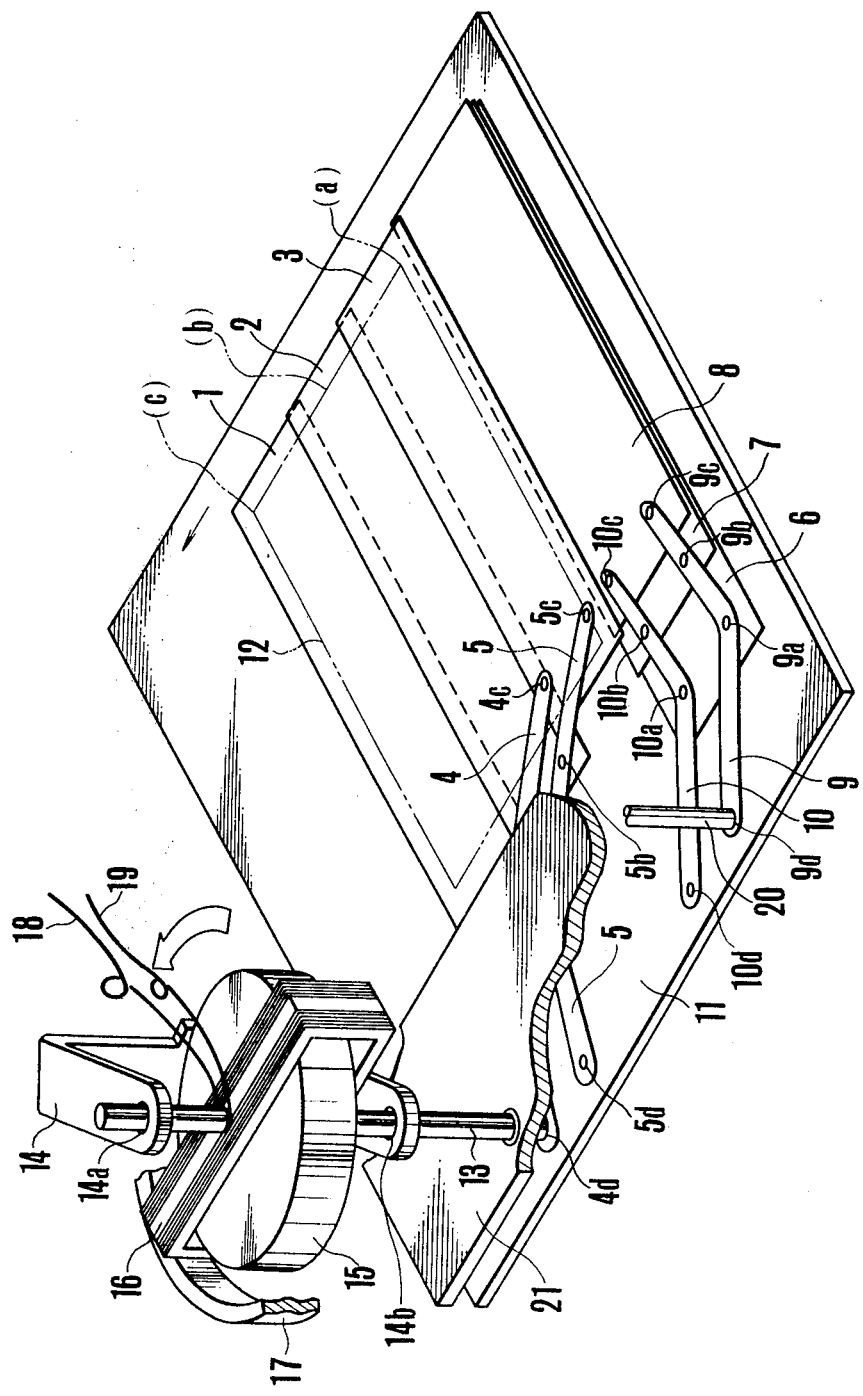
FIG. 2 is an oblique view showing an example of the structural arrangement of an electromagnetically driven shutter according to the present invention.

FIG. 2 illustrates an example of an embodiment, the structural arrangement of a focal plane shutter of the electromagnetically driven type embodying the present invention. The shutter comprises a shutter base plate 11 which is provided with an exposure window 12; and leading shutter blade supporting arms 4 and 5, one end 4d of the arm 4 being secured to a leading shutter blade driving shaft 13. The shaft 13 is rotatably attached to the shutter base plate 11.

One end 5d of the arm 5 is pivotally attached to the shutter base plate 11. The shutter further includes leading shutter blades 1, 2 and 3 which are made of a thin light shielding sheet material and are rotatably attached to the leading blade supporting arms 4 and 5 by means of pins 4a, 4b, 4c, 5a, 5b and 5c; and trailing shutter blade supporting arms 9 and 10. One end 9d of the arm 9 is secured to a trailing blade driving shaft 20. The trailing blade driving shaft 20 is rotatably attached to the shutter base plate 11. One end 10d of the other arm 10 is pivotally attached to the shutter base plate 11. The shutter further includes trailing shutter blades 6, 7 and 8, which are rotatably attached to the trailing blade supporting arms 9 and 10 by means of pins 9a, 9b, 9c, 10a, 10b and 10c. A numeral 14 indicates a frame of a meter time drive portion. The frame 14 has a cylindrically shaped permanent magnet 15 secured thereto. The permanent magnet 15 is magnetized at a predetermined position in a diametrical direction and is secured either to the shutter base plate 11 or to a fixed member which is not shown but is disposed within a camera. A numeral 16 indicates a leading blade driving coil, which serves as conductor member and has the coil wire thereof wound around a bobbin. The leading blade driving coil 16 is secured to the leading blade driving shaft 13.

The leading blade driving shaft 13 is rotatably supported by support holes 14a and 14b provided in the frame 14. The frame 14 has a yoke 17 secured thereto. The yoke 17 is opposed to the permanent magnet 15 and is arranged leave a predetermined gap between the permanent magnet and the yoke to allow the leading blade driving coil 16 to be freely rotatable. The permanent magnet 15 and the yoke 17 thus jointly form a magnetic circuit which has prescribed magnetic flux density distribution. The leading blade driving coil 16 is provided with lead wires 18 and 19 for power supply thereto.

A cover plate 21 leaves a sufficient space between it and the shutter base plate 11 to permit the leading and trailing shutter blades 1, 2, 3, 6, 7 and 8 to be freely movable there. The cover plate is provided with an exposure window which corresponds to the exposure window 12 through the cover plate 21 is shown only in part for the sake of illustration. Further, the cover plate 21 is provided with holes which are arranged to permit the leading blade driving shaft 13 and the trailing blade driving shaft 20 to pierce through them.

The shutter also includes another electromagnetic drive source for driving the trailing blade. The arrangement of this drive source is identical with the above-described leading blade driving source though it is omitted from the illustration of FIG. 1.

The shutter arranged as described in the foregoing operates in the following manner: When a current is supplied to the leading blade driving coil 16 by a driving circuit through the lead wires 18 and 19, a force is produced at a part of the coil winding located within a magnetic field. This force is produced perpendicular to the direction of the magnetic flux and the current as can be understood from Fleming's left-hand rule. This force works as a couple of forces on the leading blade driving shaft 13. Accordingly, the leading blade driving coil 16 receives a turning force exerted in the direction of an arrow shown in FIG. 2 (counterclockwise). The leading blade driving shaft 13 which is secured to the coil 16 also receives a turning force in the same direction. Then, a force is exerted on the leading blade supporting arm 4 to turn it counterclockwise. Therefore, the leading blade supporting arm 4 receives an electromagnetic force to be moved counterclockwise. Through a link mechanism, then, the leading shutter blades 1, 2 and 3 are caused to move in parallel in the direction of an arrow shown in the drawing and an exposure begins.

When a current is supplied to the trailing blade driving coil a predetermined period of time after that, the trailing shutter blade supporting arms 9 and 10 turn in the same manner as described above to cause the trailing shutter blades 6, 7 and 8 to travel in parallel with the leading shutter blades. When the fore ends of the trailing shutter blades reach their predetermined destinations, they cover the aperture provided and the exposure action of the shutter comes to an end.

Figure 3A:
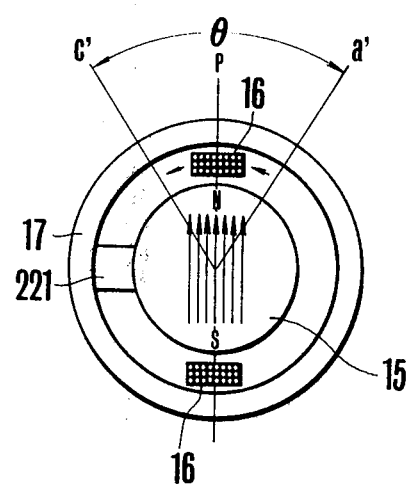
FIGS. 3(a) and 3(b) are illustrations showing an example of the magnetization position of a permanent magnet according to the invention and the characteristic thereof.

In the electromagnetic drive source described in the foregoing, the relation of the turning range of the driving coil to the magnetization direction of the permanent magnet is as shown in FIG. 3(a). The permanent magnet is magnetized in such a way that the magnetic flux density of the permanent magnet becomes the highest in the middle part of the turning range of the coil 16. As shown in FIG. 3(a), the magnet 15 is secured to the yoke 17 with a fixing member 221.

Figure 3B:
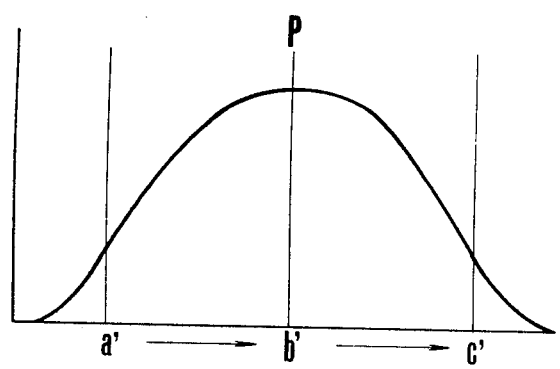

The relation of the turning phase of the driving coil 16 to the magnetic flux density is as shown in FIG. 3(b). In FIG. 3(b), the turning phase of the driving coil 16 is shown on the abscissa while the magnetic flux density or an electromagnetic force is shown on the ordinate. A reference symbol a' indicates a shutter blade travel starting position which corresponds to the positions ao and a'o shown in FIG. 1. The symbol b' indicates a middle position. A symbol c' indicates an exposure end position. Symbols N and S indicate the magnetization direction. A symbol P indicates the peak of the magnetic flux density. In this case, the driving force produced in the coil reaches its largest value in the middle area of the picture.

Figure 4A:
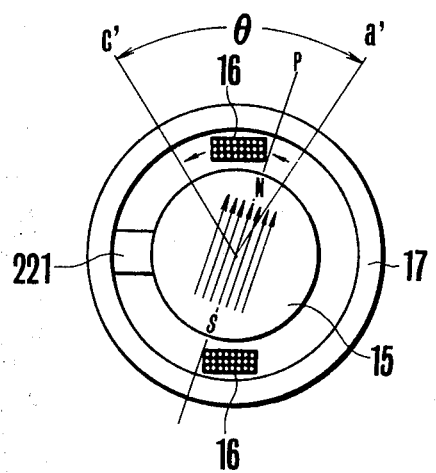
FIGS. 4(a) and 4(b) are illustrations showing an embodiment of the invention in which the magnetization position of the arrangement shown in FIG. 3(a) is shifted and the characteristic thereof.
Figure 4B:
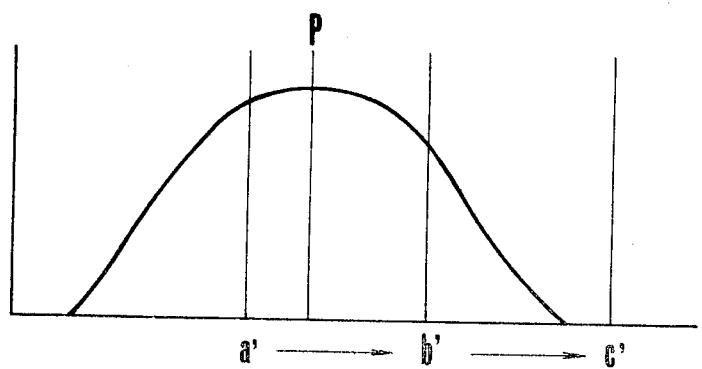

FIGS. 4(a) and 4(b) show the electromagnet arrangement and an operating characteristic of an electromagnetically driven shutter which has its travelling curve adjusted in accordance with the method of the present invention. In this case, the magnetization position of the magnet is shifted relative to the travelling range a'–c' of the shutter. With the magnetization position shifted in this manner, the peak P of the magnetic flux density distribution can be brought closer to the shutter blade travel starting position. This is advantageous particularly where a shutter of large inertia is to be driven because the rise characteristic of the shutter can be corrected for obtaining a stable shutter operation.

Figure 5A:
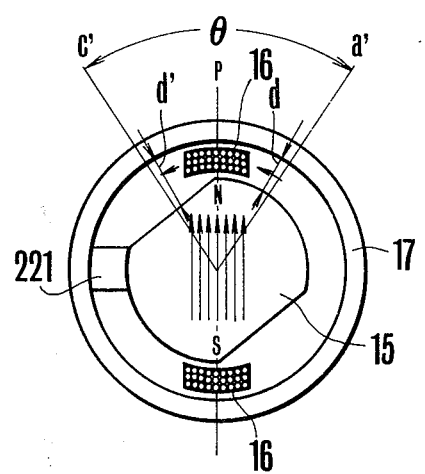
FIGS. 5(a) and 5(b) are illustrations showing a second embodiment of the invention in which the shape of the magnet shown in FIG. 3(a) is changed into a non-cylindrical shape and the characteristic thereof.
Figure 5B:
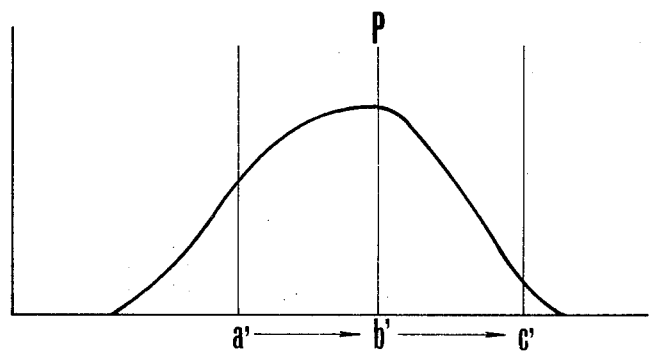

A second embodiment of the invention is as shown in FIGS. 5(a) and 5(b). FIG. 5(a) shows the structural arrangement of the embodiment and FIG. 5(b) the characteristic thereof. In this embodiment, parts of the permanent magnet 15 are cut away in such a manner that the magnetic gap d which is formed between the magnet 15 and the yoke 17 in the travel starting position becomes smaller than a magnetic gap d' formed in the travel end position c'. Meanwhile, the magnetization position is arranged to have the maximum magnetic flux density in the middle part of the travelling range. In this case, as shown in FIG. 5(b), the magnetic flux density linearly decreases between the middle part and the travel end position, so that the travelling characteristic of the shutter can be made to have the travelling speed lowered toward the end of the travel.

In this particular embodiment, the magnetic gap is adjusted by modifying the shape of the permanent magnet. However, the same effect can be obtained by modifying the shape of the yoke to adjust the magnetic gap. The arrangement to lower the magnetic flux density at the end part of the travel as in this embodiment is effective in preventing the shutter blades from bouncing.

Figure 6A:
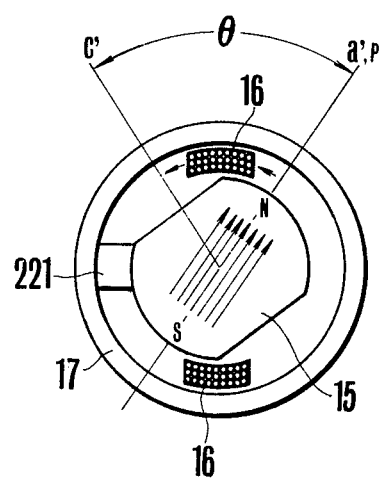
FIGS. 6(a) and 6(b) are illustrations showing a third embodiment of the invention in which the shape of the magnet shown in FIG. 4(a) is changed into a non-cylindrical shape and the characteristic thereof.
Figure 6B:
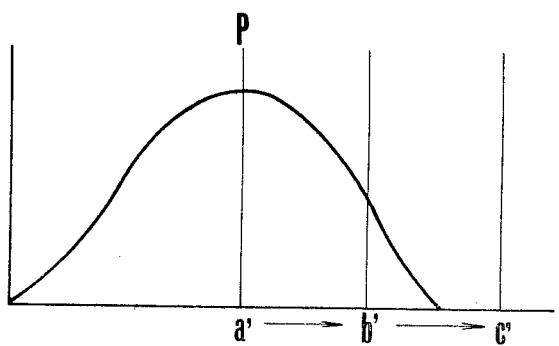

FIGS. 6(a) and 6(b) show a third embodiment of the invention, FIG. 6(a) showing the structural arrangement and FIG. 6(b) the characteristic thereof. In this embodiment, while the shape of the permanent magnet is modified to have the maximum magnetic gap at the travel end position in the same manner as in the second embodiment, the permanent magnet is magnetized in such a way as to have the maximum magnetic flux density at the travel starting position. This arrangement not only gives the maximum electromagnetic force at the start of the travel but also reduces the electromagnetic force at the end of the travel almost to zero. Therefore, even a shutter of large inertia can have a smooth rise characteristic without bouncing when stopping. Besides, this embodiment furnishes a linear travelling characteristic, which facilitates shutter control.

Figure 7A:
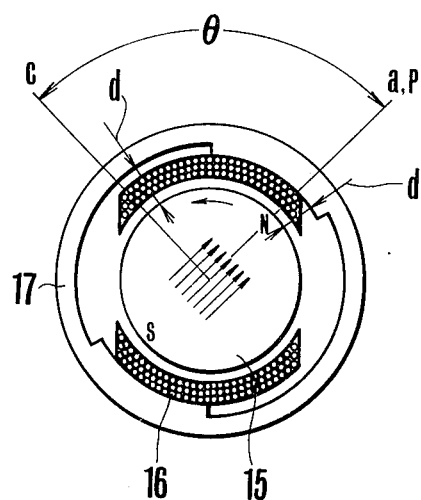
FIGS. 7(a) and 7(b) are illustrations of the structural arrangement and the characteristic of a fourth embodiment of the invention.
Figure 7B:
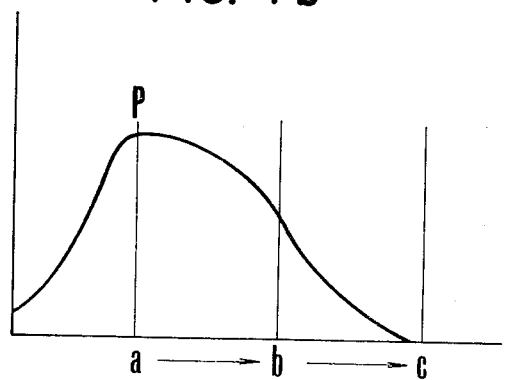

Next, FIGS. 7(a) and 7(b) illustrates a fourth embodiment of the invention, FIG. 7(a) showing the structural arrangement and FIG. 7(b) the characteristic thereof. While the first, second and third embodiments of the invention are of the moving coil type, the fourth embodiment is of the moving magnet type. In this embodiment, the coil 16 which is secured to the shaft 13 in the case of the embodiment shown in FIG. 2 is secured to the yoke instead of the shaft 13. Meanwhile, the magnet is secured to the shaft 13 and is rotatably supported by the frame 14. As shown in FIG. 7(a), the coil 16 is secured to the yoke 17 which is shaped to form a predetermined magnetic gap. The rotatable magnet 15 is of a cylindrical shape without any modification in the shape.

The magnet 15 in this case is magnetized in such a way as to have the maximum magnetic flux density at the starting position of the shutter for improvement in the rise characteristic at the time of the start.

Further, since the yoke 17 is shaped to have a large magnetic gap immediately before the starting position, a lock mechanism to be used before the travel of the shutter blades can be simplified.

Further, since a large magnetic gap is formed between the middle part of the travel and the end part of the travel, driving torque can be reduced almost to zero at the end of the travel of shutter blades to prevent bouncing.

The above-stated arrangement also permits simplification of the brake arrangement required at the end of the shutter travel.

As described in detail in the foregoing, the invention has the following advantages:

(1) With the magnetic flux density distribution between the permanent magnet and the coil adjusted and set in a prescribed manner beforehand, a desired travelling characteristic of the shutter can be obtained.

(2) For a slit exposure type shutter is particular, the travelling characteristic curve can be linearly adjusted. Therefore, the problem of uneven exposure can be solved and a high precision exposure can be made possible by the invention.

What is claimed is:

1. A focal plane shutter comprising leading and trailing groups of shutter blades, an electromagnetic drive source to drive said shutter blades from a travel start position to a travel end position to effect an exposure, the electromagnetic drive source including a coil and a permanent magnet for producing a magnetic flux as well as a drive shaft connected to transmit rotation of one of the coil and magnet to the shutter blades; said permanent magnet being arranged relative to the coil so that the magnetic flux density distribution of the magnet produces a maximum magnetic flux density in the vicinity of the travel start position of the coil, said electromagnetic drive source further including a yoke forming a gap with the magnet; and the magnetic flux density distribution of the magnet is adjusted by varying the gap formed between the permanent magnet and said yoke.

2. A focal plane shutter having leading and trailing shutter blades each of which is arranged to be driven by an electromagnetic drive source to travel from a travel start position to a travel end position to effect an exposure, said shutter being characterized in that:
the electromagnetic drive source includes a moving magnet, a fixed field coil and a yoke having a given shape; and the magnetic flux density distribution of the permanent magnet being arranged to vary relative to the coil on the basis of the shape of said yoke, the yoke being shaped to vary the gap between the magnet and the yoke so that the gap is at a minimum when the magnet is closer to the start position than to the end position.

3. A focal plane shutter, comprising:
a leading shutter blade and a trailing shutter blade,
an electromagnetic drive source to drive said shutter blades from a travel starting position to a travel end position to effect an exposure,
the electromagnetic drive source including a coil, a permanent magnet for producing a magnetic flux, and a driving shaft to transmit rotation of said coil or permanent magnet to the shutter blades, said permanent magnet and said coil as well as said shaft and said blades being arranged relative to each other so that the magnetic flux of the permanent magnet crossing said coil has the maximum intensity at a travel starting position of the shutter blades and the minimum intensity at a travel end position of the blades.

4. A focal plane shutter, comprising:

leading and trailing groups of shutter blades, an electromagnetic drive source to drive said shutter blades from a travel starting position to a travel end position to effect an exposure, the electromagnetic drive source includes a permanent magnet for producing a magnetic flux, a yoke, and a coil which is positioned within a magnetic path of said permanent magnet, the permanent magnet and the yoke being arranged to form a gap which varies between a travel start position to a travel end position of the shutter blades, the coil being arranged relative to the shutter blades and the gap being formed so that the magnetic flux of the permanent magnet crossing the coil has the minimum intensity at the travel end position of the shutter blades to prevent the shutter blades from bouncing at the travel end position.

5. A focal plane shutter according to claim 4, in which said permanent magnet has an outer circumference, a portion of the outer circumference being in cylindrical form and a portion cut away from the cylindrical form for expanding the gap between the magnet and the yoke.

6. A focal plane shutter according to claim 4, in which said yoke has an inner circumference, a portion of its inner circumference being in a cylindrical form and forming a part of the gap having a first size, said inner circumference having a second portion more distant from the yoke than the first portion for producing a second part of the gap larger in size than the first part.

* * * * *